United States Patent [19]

O'Brien

[11] Patent Number: 4,958,333
[45] Date of Patent: Sep. 18, 1990

[54] SHIELDING FOR SEISMIC CABLES

[75] Inventor: John T. O'Brien, San Antonio, Tex.

[73] Assignee: Southwest Research Institute, San Antonio, Tex.

[21] Appl. No.: 297,453

[22] Filed: Jan. 12, 1989

[51] Int. Cl.$^5$ ............................................. H01B 11/06
[52] U.S. Cl. ..................................... 367/154; 174/115; 367/13
[58] Field of Search ..................... 174/115; 307/89, 91; 367/76, 154, 13

[56] References Cited

U.S. PATENT DOCUMENTS

| | | | |
|---|---|---|---|
| 3,023,267 | 2/1962 | Rubenstein et al. | 174/115 |
| 3,622,683 | 11/1971 | Roberts et al. | 174/36 |
| 3,673,315 | 6/1972 | Lasley | 174/107 |
| 3,816,644 | 6/1974 | Giffel et al. | 174/115 |
| 3,829,603 | 8/1974 | Hansen et al. | 174/115 |
| 4,188,080 | 2/1980 | Streble | 339/14 R |
| 4,491,939 | 1/1985 | Carpenter | 367/20 |
| 4,636,998 | 1/1987 | Greene et al. | 367/154 |
| 4,847,443 | 7/1989 | Basconi | 174/115 |

Primary Examiner—Ian J. Lobo
Attorney, Agent, or Firm—Richard J. Smith

[57] ABSTRACT

Seismic cable shielding method and apparatus. Shielding is obtained by switching unused wire pairs to ground via a roll-along switch which is connected to system ground. Grounding of the unused conductors in the cable is accomplished by ground connections at the roll-along switch. By grounding the unused conductor pairs (all pairs except those required for the sensor signals) within the cable, partial shielding is provided between the active wire pairs and cross-talk is reduced to a negligible level. Additional wire pairs are hardwired to system ground and distributed uniformly throughout the cable cross section to form an interstitial shield.

6 Claims, 7 Drawing Sheets

SHIELDING FOR SEISMIC CABLES

STATEMENT OF GOVERNMENTAL INTEREST

The United States Government has rights in the present invention pursuant to Contract DACA39-87-K-0063. The United States Government has a nonexclusive, nontransferable, irrevocable, paid up license to practice or have practiced on behalf of the United States, this invention throughout the world.

BACKGROUND OF THE INVENTION

The present invention relates generally to the field of seismic exploration. More particularly, the present invention relates to a method of internal seismic cable shielding.

Seismic exploration data in the frequency band of 5 Hz to 150 Hz are presently gathered in the field using multiple twisted-wire-pair seismic cables in which the number of circuits is typically in the range from 100 to 250. Further, when acquiring seismic data, more wire pairs are typically deployed on the ground than are actually used at any one time. However, the quality of the multi-channel data is typically reduced because of crosstalk (cross-feed) between wire pairs in the cable as well as by pickup of 60 Hz and its harmonics from power lines. If 60 Hz becomes too great a problem, most seismic recording systems are equipped with notch filters that will cut this narrow band signal by 80 dB or more. However, notch filters have the undesirable property of distorting the phase of the desired seimic signals within the frequency range of about 50 to 75 Hz for a 60 Hz notch filter. This problem is not so severe when the bandwidth of interest in seismic recording ranged from 5 Hz to 50 Hz, but, as bandwidth capabilities have been expanded to higher frequencies in the range of 5 Hz to 250 Hz and above, this notch filter phase distortion effect falls in the frequency band of interest. The higher harmonics of the 60 Hz signals now also cause interference pickup problems. Because crosstalk between wire pairs within the cable is due to inductive and capacitive coupling, it also increases significantly for higher frequencies and as the length of the cable is increased.

One technique that can be used for decreasing crosstalk and power line pickup is to use shielded wire pairs (i.e., wire pairs with grounded mesh shields around each wire pair) and external cable shielding and grounding. However, shielded wire pair cable which utilizes such a technique is not normally used since it is more expensive, heavier, stiffer and more difficult to work with in the field than unshielded cable. As such, the art has heretofore lacked an appropriate method of seismic cable shielding which overcomes the foregoing limitations and effectively reduces internal cross-talk and 60 Hz pick up from external sources.

SUMMARY OF THE INVENTION

Accordingly, the present invention provides a method of internal seismic cable shielding using grounded, unused conductors. The present invention requires the conductors to do double duty such that they not only serve as signal conductors, but while not being actively used, they serve as grounded shielding to reduce internal cross-talk and 60 Hz pickup from external sources. Further, the wire pair configuration of the present invention is such that the signal carrying wire pairs in each cable are surrounded by grounded wire pairs in the respective cable to the greatest extent possible.

In the system of the present invention, three identical seismic cable sections are connected in series to form a cable leg. The cable leg is connected to a roll-along switch which is connected to recording instruments. Each cable has 12 three-component takeouts totaling 36 channels. Furthermore, each cable has a plurality of wire pairs therein, thirty six of which are connected to sensors. Each section of cable is required to act as a jumper for signals picked up through takeouts in the other two sections. Since the recording system utilized in connection with the present invention is a 48 channel system, only 48 wire pairs or less will be actively carrying signals at any one time in any given cable section. When wire pairs are inactive, one side of each wire pair will be connected to system ground. That is, when selected wire pairs are activated by the switch, other wire pairs are simultaneously grounded such that the grounded wire pairs are distributed in a substantially uniform manner across a cross-section of the cable.

In the wiring configuration utilized in the present invention, 130 wire pair cables are used with the wire pairs carrying signals distributed throughout the cross-section of the cable. Twenty two wire pairs are always connected to system ground and one side of the wire pairs which are connected to sensors but not currently connected to the recording system are connected to ground. By grounding the unused conductor pairs (all pairs except those required for the sensor signals), partial shielding is provided between the active wire pairs. Further, in the wire pair configuration of the present invention, approximately 40% of the conducting volume of the cable is grounded. Because the seismic cables are helically wound with a complete turn approximately every 4 inches, this grounded volume provides an effective shielding mesh around the signal carrying wire pairs at a very modest increase in cost and weight and essentially no increase in the stiffness of the cable.

DETAILED DESCRIPTION OF THE PREFERRED EMBODIMENT

Figure 1:
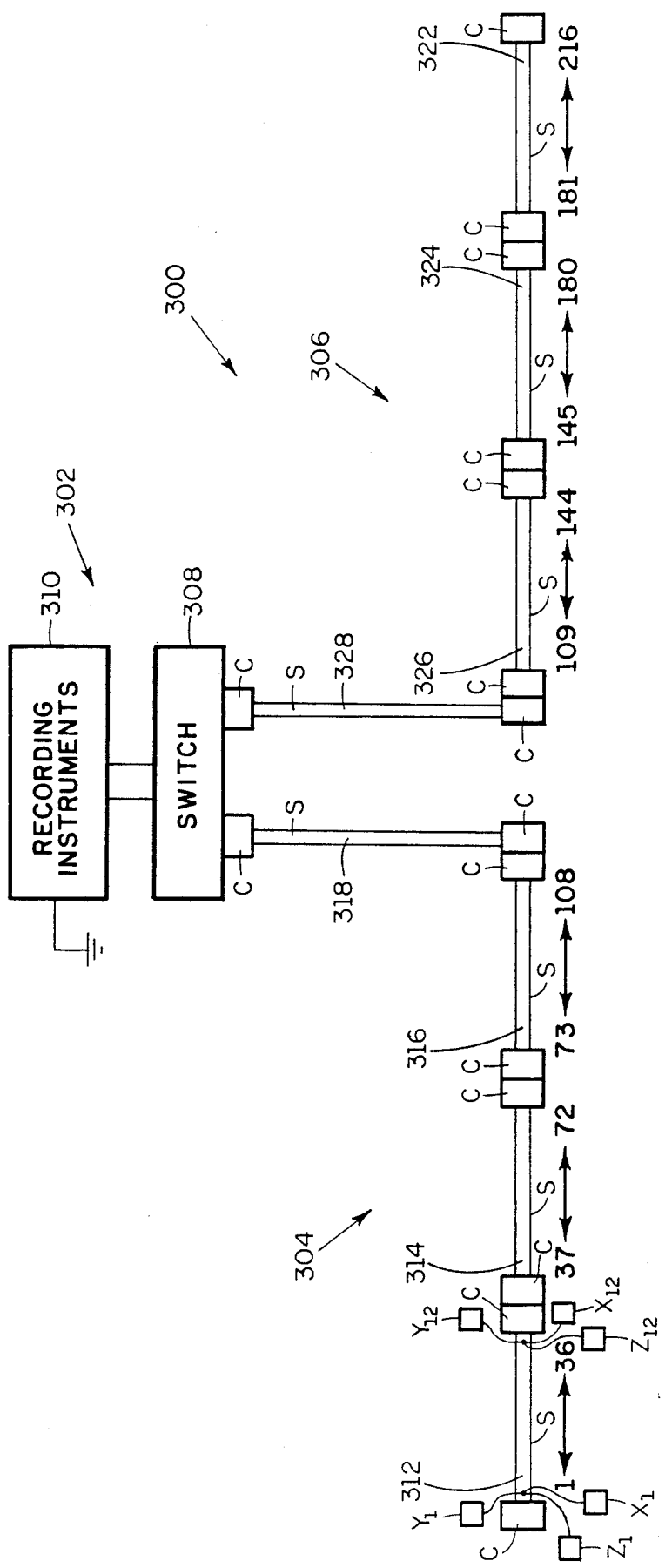
FIG. 1 is a schematic illustration of the seismic data acquisition system of the present invention illustrating the field geometry of the system.

Referring to FIG. 1, the seismic data acquisition system of the present invention is identified by the number 300. The system 300 comprises a data recording system 302 and a pair of seismic cable legs 304 and 306 which are connected to the recording system 302. The recording system 302 is a 48 channel recording system comprising a switch 308 which is connected to appropriate recording instruments 310. Switch 308 is a commercially available roll-along switch, such as the rotary "Rota-Long" switch from Input/Output, Inc., which has been modified as described hereinbelow. Alternatively, switch 308 may be a linear switch. Recording instruments 310 are commercially available multi-channel digital recording instruments. The system 300 is also provided with an appropriate power supply (not shown).

Referring again to FIG. 1, cable leg 304 comprises a plurality of identical hermaphroditic seismic cables 312, 314, and 316 and a hermaphroditic jumper cable 318 which are connected in series. Cables 312, 314, 316 and 318 comprise seismic cables having a plurality of wire pairs or conductors therein which are configured in a manner as described hereinbelow. Cable 312 may be referred to as the primary cable of leg 304 and is dedicated to surface channels 1–36. Cable 314 may be referred to as the intermediate cable of leg 304 and is dedicated to surface channels 37–72. Cable 316 may be referred to as the terminal cable of leg 304 and is dedicated to surface channels 73–108. As described hereinbelow, each cable 312, 314 and 316 serves as an active unit for 36 channels and as a jumper cable for the other two sets of 36 channels in cable leg 304. Cable 318 may be referred to as the jumper cable of leg 304 and is utilized to connect cable 316 to switch 308.

Referring again to FIG. 1, cable leg 306 comprises a plurality of identical hermaphroditic seismic cables, 322, 324, and 326 and a hermaphroditic jumper cable 328 which are connected in series. Cables 322, 324, 326 and 328 comprise seismic cables having a plurality of wire pairs or conductors therein which are configured in a manner as described hereinbelow. Cable 322 may be referred to as the primary cable of leg 306 and is dedicated to surface channels 181–216. Cable 324 may be referred to as the intermediate cable of leg 306 and is dedicated to surface channels 145–180. Cable 326 may be referred to as the terminal cable of leg 306 and is dedicated to surface channels 109–144. As described hereinbelow, each cable 322, 324 and 326 serves as an active unit for 36 channels and as a jumper cable for the other two sets of 36 channels in cable leg 306. Cable 328 may be referred to as the jumper cable of leg 304 and is utilized to connect cable 326 to switch 308.

Referring again to FIG. 1, each of the cables 312, 314, 316, 322, 324, and 326 are provided with 12 surface positions or takeout locations with three geophones or sensors (x, y and z) connected to the respective cable at each takeout location. The sensors at takeout location 1 of cable 312 are identified as $x_1$, $y_1$, and $z_1$ and the sensors at takeout location 12 of cable 312 are identified as $x_{12}$, $y_{12}$ and $z_{12}$. For purposes of clarity, only the sensors at takeout locations 1 and 12 of cable 312 are illustrated. One active wire pair is connected to each sensor and each sensor corresponds to a surface channel. Further, each takeout location or surface position represents three channels from which the recording system 302 may record data. Since the recording system 302 described herein is a 48 channel recording system, data may be acquired from 48 consecutive surface channels.

Referring again to FIG. 1, it is to be understood that the cables 312, 314, 316, 322, 324, and 326 are identical hermaphroditic seismic cables and cables 318 and 328 are identical hermaphroditic jumper cables. Each of the cables 312, 314, 316, 318, 322, 324, 326 and 328 have a cylindrical sheath S surrounding their respective cable bundle and a connector C on each end thereof. Each connector C is connected to its respective cable sheath S and wired to the wire pairs within the respective cable sheath S. The wire pairs extend the length of the sheath S from the connector C on one end of the cable to the connector C on the opposite end of the respective cable. The connectors C permit connection of the cables 312, 314, 316, 318, 322, 324, 326 and 328 to an adjacent cable and, in the case of cables 318 and 328, connection to switch 308.

Figure 2A:
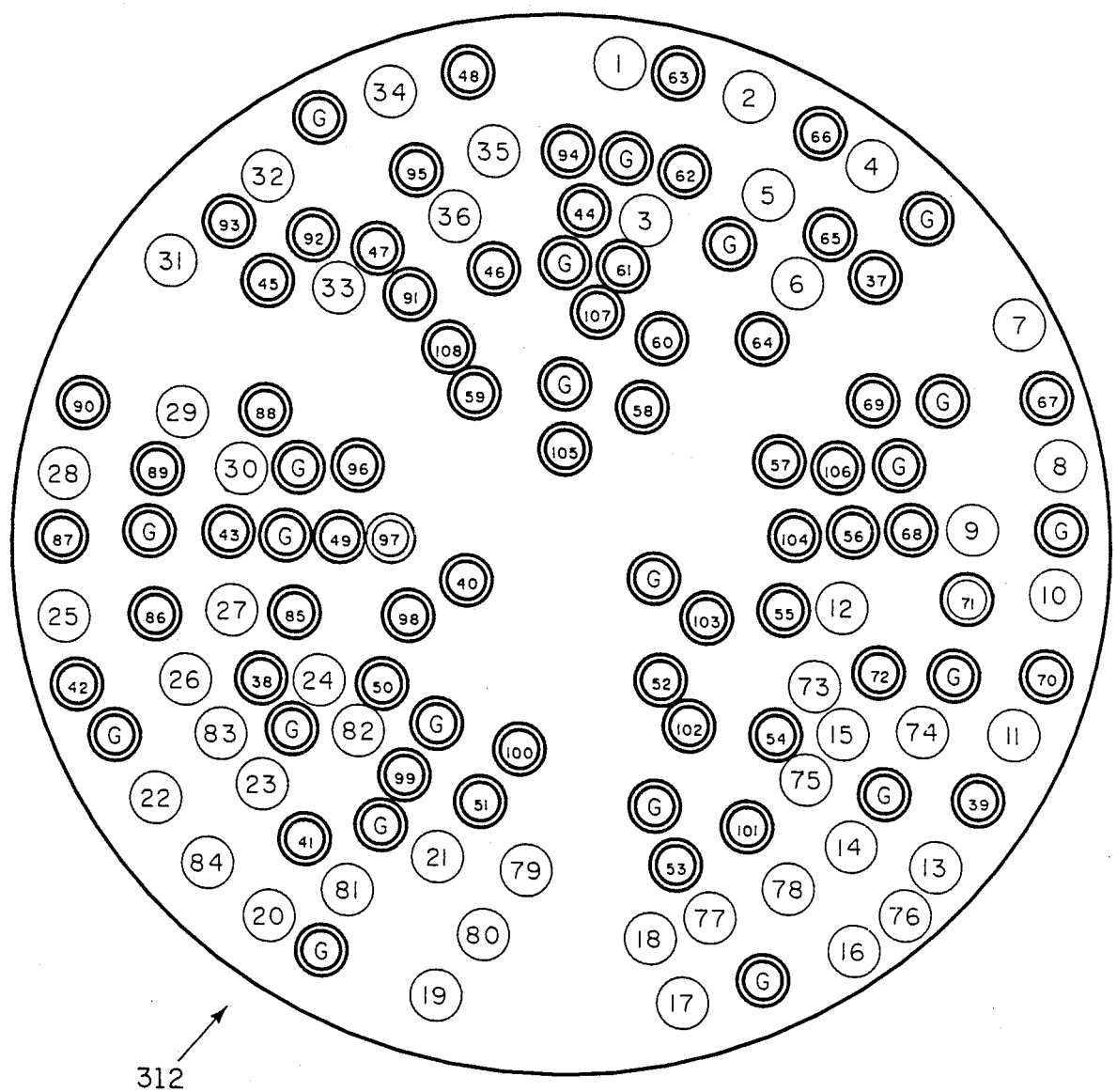
FIG. 2a is a cross-section of a primary seismic cable of the present invention as represented by the template used to manufacture the cable.
Figure 2B:
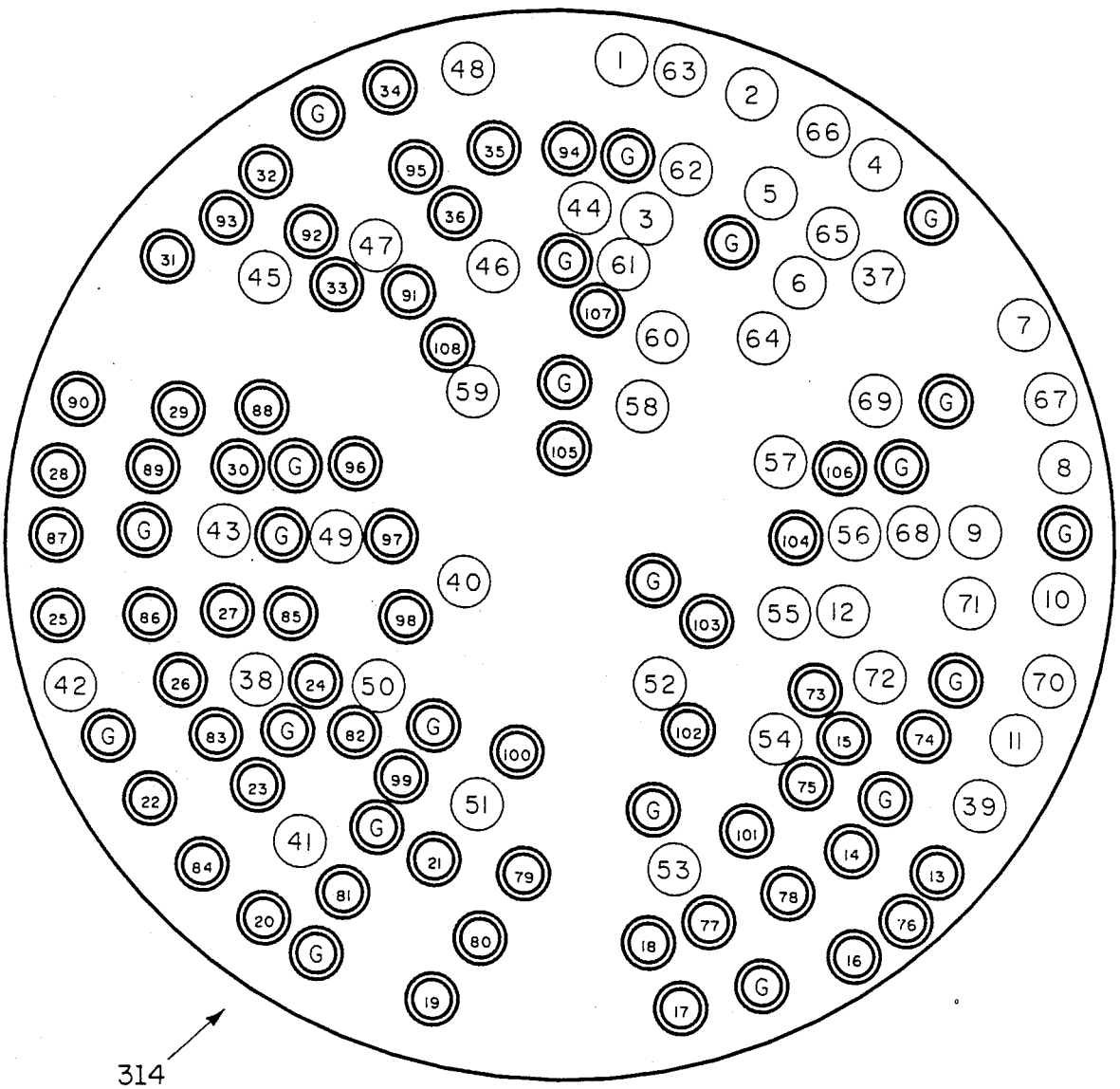
FIG. 2b is a cross-section of an intermediate seismic cable of the present invention as represented by the template used to manufacture the cable.
Figure 2C:
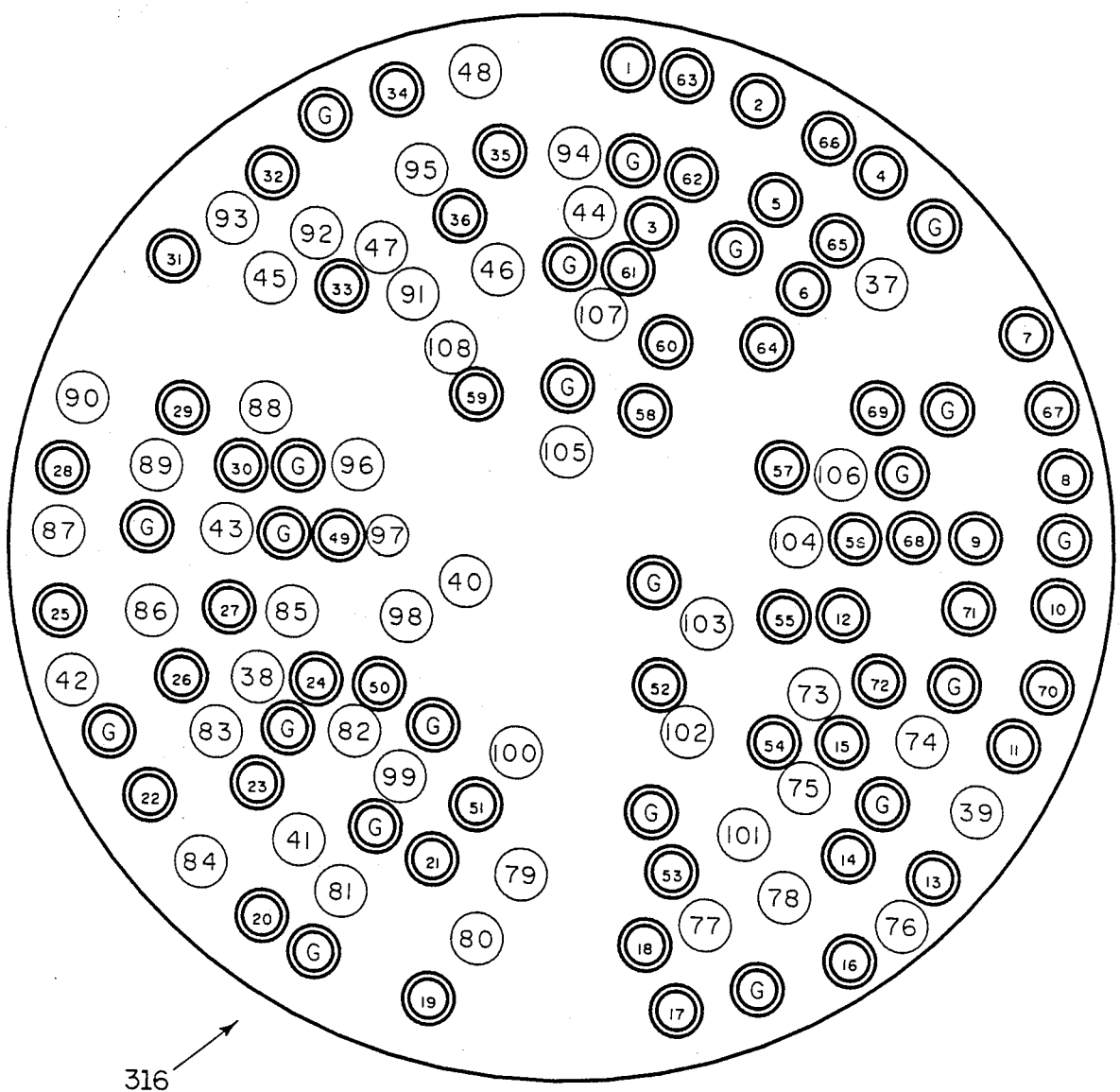
FIG. 2c is a cross-section of a terminal seismic cable of the present invention as represented by the template used to manufacture the cable.

Referring to FIGS. 2a, 2b, and 2c, cables 312, 314, 316, 318, 322, 324, 326 and 328 have 130 twisted wire pairs or conductors which are distributed or configured in the manner illustrated in FIGS. 2a, 2b and 2c. Of the 130 twisted wire pairs, 108 pairs are devoted to data channels and the remaining 22 pairs have both wires hardwired to system ground. System ground is at one point only, as illustrated by the ground symbol in FIG. 1, to preclude generation of a grounding loop. As illustrated in FIGS. 2a, 2b, and 2c, each encircled number and letter "G" represent a wire pair. The wire pairs identified by the letter "G" represent the 22 pairs hardwired to system ground. Cables 312, 314, 316, 318, 322, 324, 326 and 328 are helically wound with a complete turn approximately every 4 inches so that the wire pairs are laid out as along helixes.

Figure 3:
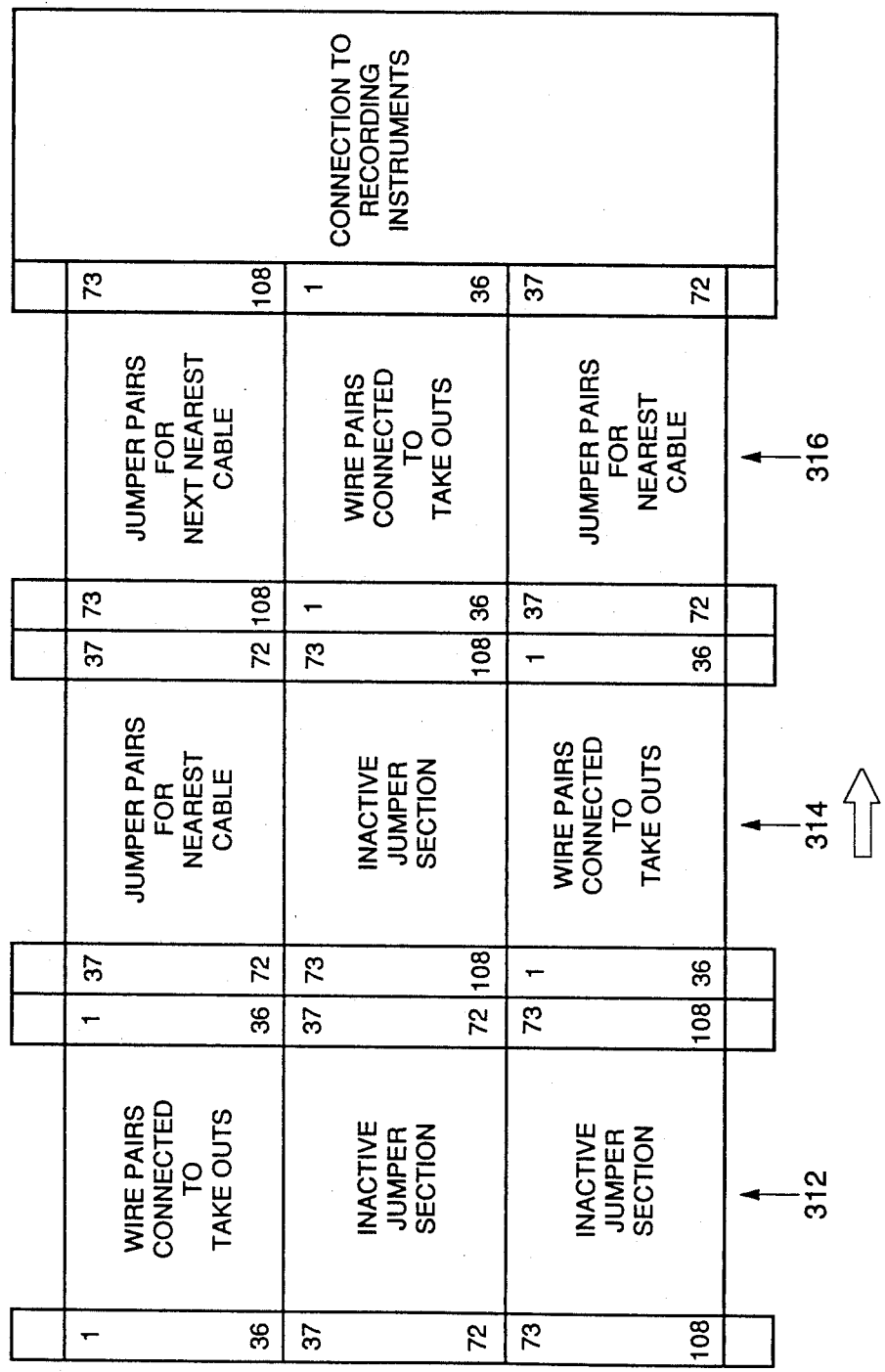
FIG. 3 is a chart illustrating three seismic cables connected in series and their corresponding numbered wire pairs.

Referring to FIG. 3, the active wire pairs are indicated by the numbers 1–36, with groups of three wire pairs wired to each takeout location such that one active wire pair corresponds to each channel. These active wire pairs are preferably near the perimeter of the cable bundle to facilitate ease in manufacturing. Numbers 37–72 indicate the channels or wire pairs jumpered from an adjacent cable, and numbers 73–108 indicate the channels or wire pairs jumpered from the next nearest cable. As illustrated in FIG. 3, wire pairs 1–36 of cable 312 are connected to wire pairs 37–72 of cable 314 and wire pairs 37–72 of cable 314 are connected to wire pairs 73–108 of cable 316. Wire pairs 37–72 of cable 312 are connected to wire pairs 73–108 of cable 314 and wire pairs 73–108 of cable 314 are connected to wire pairs 1–36 of cable 316. Wire pairs 73–108 of cable 312 are connected to wire pairs 1–36 of cable 314 and wire pairs 1–36 of cable 314 are connected to wire pairs 37–72 of cable 316. The clear arrow in FIG. 3 indicates the direction of data flow.

Figure 4A:
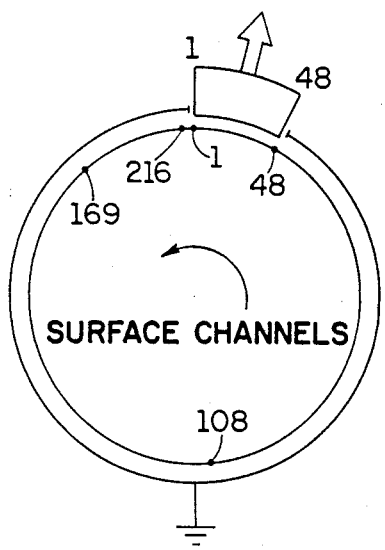
FIG. 4a is a schematic illustration of the switching technique of the present invention when 48 active channels are at surface channels 1–48.
Figure 4B:
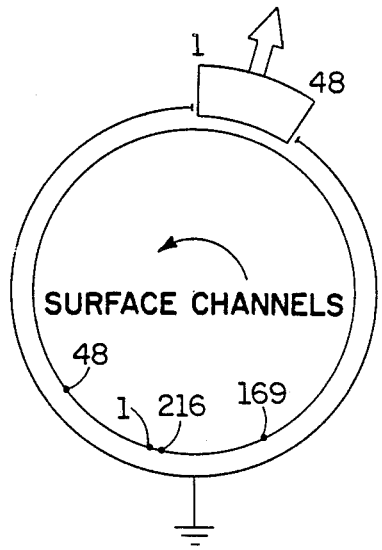
FIG. 4b is a schematic illustration of the switching technique of the present invention when the 48 active channels are at intermediate sruface channels.
Figure 4C:
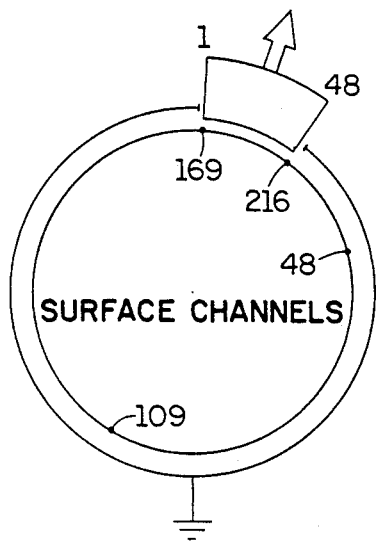
FIG. 4c is a schematic illustration of the switching technique of the present invention when the 48 active channels are at surface channels 169–216.

As the roll-along switch 308 is moved through 48 consecutive surface channels in the group of surface channels 1–216, only 48 wire pairs are actively carrying signals. The remaining wire pairs have one side connected to ground. Only one side is grounded to preclude the creation of short circuits involving the sensors not being recorded. This switching technique is illustrated schematically in FIGS. 4a, 4b, and 4c. The clear arrow in FIGS. 4a, 4b and 4c indicates output to the recording instruments 310. When wire pairs are selectively activated such that signals are propagated therethrough, other wire pairs are simultaneously grounded. FIG. 4a illustrates the recordation of surface channels 1-48 with the remaining surface channels 49-216 being grounded. However, as the roll-along switch 308 is rotated in the direction illustrated by the arrow in FIG. 4a to the position illustrated in FIG. 4b, 48 consecutive intermediate surface channels will be recorded with the remaining surface channels simultaneously switched to ground. When the roll-along switch 308 is rotated in the direction illustrated by the arrow in FIG. 4b to the position illustrated in FIG. 4c, surface channels 169-216 are being recorded and the remaining surface channels 1-168 are simultaneously switched to ground.

FIGS. 2a, 2b and 2c illustrate the condition of the 108 wire pairs within cables 312, 314 and 316 when surface channels 1-48 are being recorded. The condition of the 130 wire pairs in jumper cable 318 is identical to that of the 130 wire pairs in seismic cable 316. The permanently grounded pairs are represented by concentric circles around the letter "G". The inactive wire pairs which are grounded when surface channels 1-48 are being recorded are identified by concentric circles around their respective wire pair number. The wire pairs which are active when surface channels 1-48 are being recorded are represented by a single circle around the respective wire pair number. When the switch 308 is recording surface channels 1-48, wire pairs 1-36 of cable 312 and wire pairs 1-12 of cable 314 are connected to active sensors. Further, wire pairs 73-84 are active in cable 312 because they are connected to wire pairs 1-12 in cable 314, wire pairs 37-72 in cable 314 serve as active jumpers for wire pairs 1-36 in cable 312, wire pairs 37-48 in cable 316 serve as active jumpers for wire pairs 1-12 in cable 314, and wire pairs 73-108 in cable 316 serve as active jumpers for wire pairs 1-36 in cable 312. By using FIG. 3, the condition of the 108 pairs devoted to data channels can be determined for each position of the switch 308 as it is moved through the surface channels of each cable leg. In referring to FIG. 3 with respect to cable leg 306, cable 316 and surface channels 73-108 correspond to cable 326 and surface channels 109-144, cable 314 and surface channels 37-72 correspond to cable 324 and surface channels 145-180, cable 312 and surface channels 1-36 correspond to cable 322 and surface channels 181-216, and jumper cable 318 corresponds to jumper cable 328. When the switch 308 is recording surface channels 169-216, wire pairs 1-36 of cable 322 and wire pairs 1-12 of cable 324 are connected to active sensors. Further, wire pairs 73-84 are active in cable 322 because they are connected to wire pairs 1-12 in cable 324, wire pairs 37-72 in cable 324 serve as active jumpers for wire pairs 1-36 in cable 322, wire paris 37-48 in cable 326 serve as active jumpers for wire pairs 1-12 in cable 324, and wire pairs 73-108 in cable 326 serve as active jumpers for wire pairs 1-36 in cable 322. The condition of the 130 wire pairs in jumper cable 328 is identical to that of the 130 wire pairs in seismic cable 326. The direction of data flow indicated in FIG. 3 is the same for cable legs 304 and 306.

It is to be understood that the 108 data carrying wire pairs are selectively specified to be uniformly distributed throughout the cable cross-section so that shielding is approximately uniform for all cable circuits. That is, the wire pair configuration or design is such that the wire pairs in the three groups (1-36, 37-72 and 72-108) are uniformly distributed throughout the cable cross-section such that, as the roll-along switch 308 grounds various wires, there is always a uniform distribution of grounded wire pairs at interstitial locations within the cables 312, 314, 316, 318, 322, 324, 326 and 328, and to the greatest extent possible, no adjacent wire pairs are active. In addition, the 22 unused pairs are selected so as to be uniformly distributed throughout the cable cross-section and always connected to system ground to form an interstitial shield. It is also to be understood that this grounded cross-sectional distribution rotates with the helical twist configuration used in the manufacture of the cables, resulting in a grounded "Faraday" cage within the cables 312, 314, 316, 318, 322, 324, 326 and 328.

As indicated hereinabove, when wire pairs are inactive, one side of each wire pair will be connected to system ground. This may be accomplished by means of a ground buss in the switch 308 comprising a continuous metal grounding strip in contact with one of each pair of pins corresponding to each surface channel or sensor. For example, a metal cylinder may be positioned about the bottom of each positive pin and wrapped with a metal grounding buss wire or strip which is tacked to the metal cylinder with solder and connected to system ground. As the dial of the switch 308 is rotated through wire pairs connected to surface channels 1-206, wire pairs connected to 48 consecutive surface channels will actively carry signals and the wire pairs connected to the remaining surface channels will have one side connected to ground. This is, those wire pairs which would otherwise be "floating" or inactive have one side switched to ground.

The shielding effects provided by the grounding connections of roll-along switch 308 may be seen by considering wire pairs 1,2, and 3 near the upper center of FIG.2a. When wire pairs 1,2, and 3 carry signals, wire pairs 61, 62, 63 and 66 will be grounded as well as the permanently grounded wire pairs "G". When the wire pairs numbered in the sixties act as jumpers and carry active signals, wire apirs 1, 2, and 3 are grounded by the roll-along switch 308 to provide shielding. This wire pair selection scheme is organized to take place throughout the cross section of each signal carrying cable as the switch 308 rolls through surface channels 1-216.

In the wiring configuration described herein, 40% or more of the conductors in each of the cables 312, 314, 316, 318, 322, 324, 326 and 328 is connected to system ground at all times. Test measurements have indicated that grounding this conducting volume reduces crosstalk by 15 to 60 dB, depending on the relative locations of the wire pairs in the respective cable cross-section. This shielding also provides a reduction in powerline pickup. Test results indicate that a minimum of 30 dB reduction of powerline pickup is achieved for 60 Hz and its haromincs (up to 480 Hz).

Figure 5:
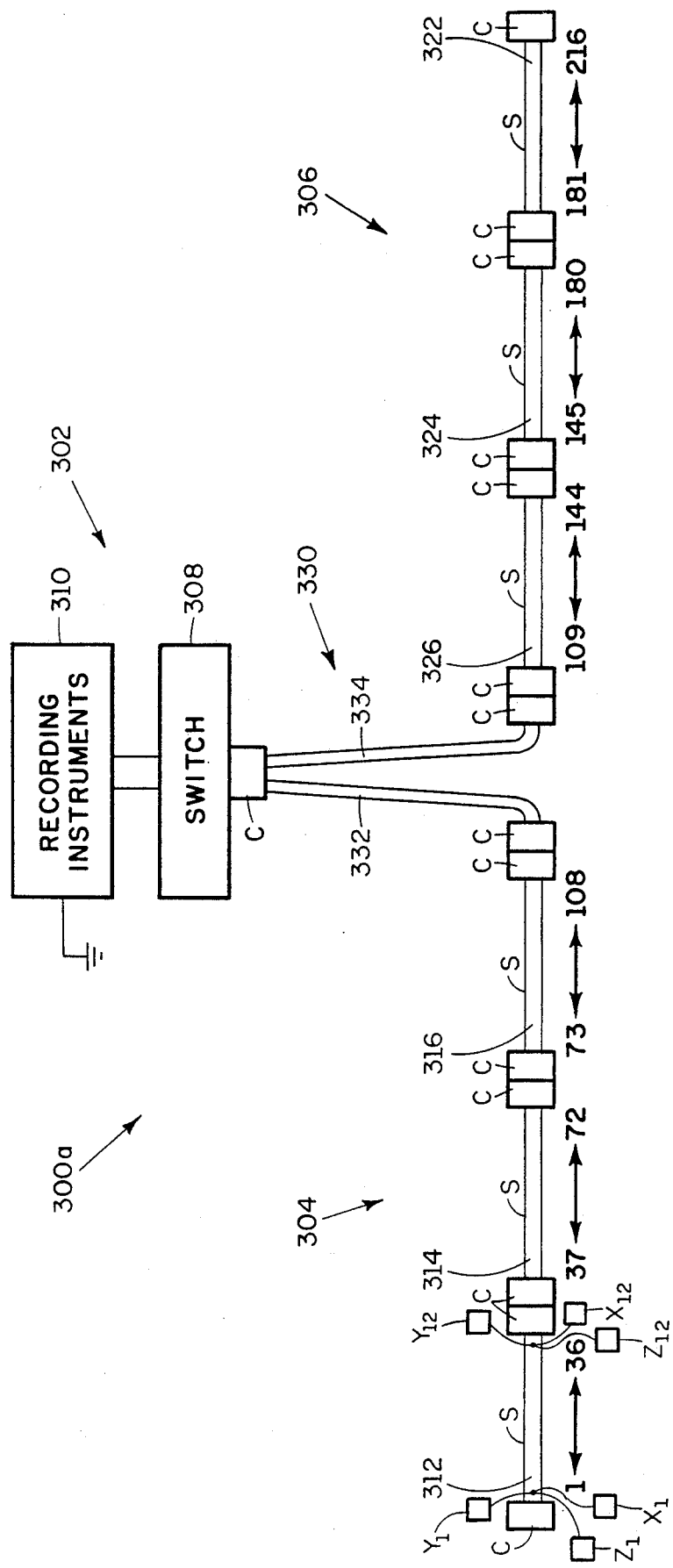
FIG. 5 is a schematic illustration of an alternate embodiment of a seismic data acquisition system illustrating the use of an unscramble jumper or adaptor.

Referring to FIG. 5, an alternate embodiment of a seismic data acquisition system is identified by the number 300a, with like numbers utilized to identify components identical to system 300. The system 300a comprises an adaptor or unscrambler jumper 330 connected to the terminal cables 316 and 326 and the switch 308. Jumper 330 comprises a connector leg 332 and a connector leg 334 which are connected to cables 316 and 326, respectively. Legs 332 and 334 are connected to a common connector C which is connected to switch 308. Jumper 330 is designed to allow three component sensors (x, y and z) at each takeout location to be selectively used in up to 48 single component active sensor stations. That is, the adaptor 330 selects the sensor components it wants to record, such as the first, second or third component at each takeout location, and the components not selected are hardwired to system ground. For example, data may be recorded from the x component of 48 consecutive takeout locations. When adaptor 330 is so utilized, the remaining x components in cable legs 304 and 306 are switched to ground by switch 308 and all of the y and z components throughout the cable legs 304 and 306 have one side permanently connected to system ground through the adaptor 330, thereby providing desired cable shielding.

It is to be understood that while the present invention has been described with reference to a 48 channel recording system 302, an alternate recording system having an alternate number of channels may also be utilized. It is also to be understood that one or more sensors may be connected at each takeout location. It is also to be understood that cables may be manufactured having wires adapted to be permanently grounded in a manner such that the permanently grounded wire pairs are distributed in a substantially uniform manner across the cable cross-section, thereby providing an effective cable shield and eliminating the need to switch wire pairs to ground.

While the shielding for seismic cables has been described in connection with the preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. Apparatus for acquiring seismic data, comprising:
A plurality of sensors connected to a cable, said cable comprising a plurality of wire pairs, each of said wire pairs being connected to one of said sensors;
switch means connected to said cable for selectively activating selected ones of said wire pairs and selectively grounding a plurality of other ones of said wire pairs upon said selected activation of said selected ones of said wire pairs; and
means connected to said switch means for recording data from selected ones of said sensors to which said selected ones of said wire pairs are connected.

2. A method for shielding a seismic cable in a seismic data acquisition system utilizing a plurality of sensors, wherein said cable has a plurality of wire pairs therein, comprising the steps of:
selectively activating selected ones of said wire pairs; and
simultaneously grounding other ones of said wire pairs such that said grounded wire pairs are distributed in a substantially uniform manner across a cross-section of said cable.

3. A method for shielding a seismic cable, as recited in claim 2, further comprising the step of permanently grounding additional ones of said wire pairs prior to said step of selectively activating selected ones of said wire pairs.

4. A seismic cable, comprising:
a sheath;
a plurality of wire pairs within said sheath, said wire pairs having a cross-sectional configuration such that when selected ones of said wire pairs are selected by a switching means, other ones of said wire pairs are simultaneously grounded by said switching means and said grounded ones of said wire pairs are distributed in a substantially uniform manner across said cross-section; and
means on each end of said sheath for connecting said plurality of wire pairs to an adjacent cable.

5. Apparatus for acquiring seismic data, comprising:
a plurality of sensors connected to a cable, said cable comprising a plurality of conductors, each of said conductors being connected to one of said sensors; and
switch means connected to said cable for selectively activating selected ones of said conductors and selectively grounding a plurality of other ones of said conductors upon said selected activation of said selected ones of said conductors.

6. A seismic cable, comprising:
a sheath; and
a plurality of conductors within said sheath, said conductors having a cross-sectional configuration such that when selected ones of said conductors are selected by a switching means, other ones of said conductors are simultaneously grounded by said switching means and said grounded ones of said conductors are distributed in a substantially uniform manner across said cross-section.

* * * * *